United States Patent [19]
White

[11] 3,805,634
[45] Apr. 23, 1974

[54] STEERING GEAR ASSEMBLY

[75] Inventor: Robert L. White, Frankenmuth, Mich.

[73] Assignee: General Motors Corporation, Detroit, Mich.

[22] Filed: Feb. 2, 1973

[21] Appl. No.: 329,202

[52] U.S. Cl. .................................. 74/441, 74/499
[51] Int. Cl. ............................................ F16h 55/18
[58] Field of Search .......... 74/89.15, 499, 492, 440, 74/441

[56] References Cited
UNITED STATES PATENTS

| | | | |
|---|---|---|---|
| 792,964 | 6/1905 | Cahen | 74/440 |
| 813,186 | 2/1906 | Warrington | 74/440 |
| 1,167,873 | 1/1916 | Appleman | 74/440 |
| 2,002,644 | 5/1935 | Pohl | 74/440 |
| 2,273,784 | 2/1942 | Kahl | 74/440 |
| 2,192,188 | 3/1940 | Green | 74/440 |
| 2,916,945 | 12/1959 | Rittenhouse et al. | 74/440 |
| 2,953,932 | 9/1960 | Lincoln | 74/499 |

Primary Examiner—Samuel Scott
Assistant Examiner—Wesley S. Ratliff, Jr.
Attorney, Agent, or Firm—Saul Schwartz

[57] ABSTRACT

A steering gear assembly particularly adapted for automobile applications and including a housing, a worm shaft disposed on the housing for rotation about a first axis of the latter, a rack nut member disposed on the worm shaft for bodily shiftable movement in response to rotation of the worm shaft and having a plurality of straight rack teeth, a sector member disposed on the housing for pivotal movement about a second axis of the latter and having a plurality of straight gear teeth the roots of which are parallel to the second axis, the gear teeth meshingly engaging the rack teeth, and an anti-lash insert disposed in a cavity in the rack nut member and having a plurality of tooth segments with profiles corresponding to the profile of the rack teeth. The insert is spring biased toward an offset position wherein the tooth segments are disposed at an angle with respect to the gear teeth so that the latter, upon engagement with the rack teeth, are resiliently captured in a no-lash condition between each tooth segment and corresponding ones of the rack teeth.

3 Claims, 8 Drawing Figures

STEERING GEAR ASSEMBLY

This invention relates generally to an automotive steering gear assembly and, more particularly, to the elimination of lash between meshingly engaged gear teeth within the assembly.

The primary feature of this invention is that it provides an improved automotive steering gear assembly of the type including a housing, a worm shaft rotatably disposed on the housing, a rack nut member disposed on the worm shaft, and a sector gear pivotally supported on the housing and including a plurality of gear teeth meshingly engaged with a plurality of rack teeth on the rack nut member. Another feature of this invention is that it provides an improved steering gear assembly of the type described including a simplified arrangement for eliminating lash between the rack teeth and the gear teeth. Yet another feature of this invention resides in the provision in the improved steering gear assembly of an anti-lash insert on the rack nut member which is spring biased to capture the gear teeth and thereby eliminate lash between the gear teeth and the rack teeth while simultaneously compensating for any wear therebetween. A further feature of this invention resides in the provision in the improved steering gear assembly of an anti-lash insert having a semi-circular configuration and a plurality of tooth segments of the same profile as the rack teeth, the insert being disposed in a semi-circular cavity in the rack teeth and spring biased toward an offset position wherein the tooth segments are disposed at an angle with respect to the rack teeth so that when the gear teeth meshingly engage the rack teeth the insert is pivoted against the spring bias to capture the gear teeth in a no-lash condition between the tooth segments and the rack teeth.

These and other features of this invention will be readily apparent from the following specification and from the drawings wherein.

Figure 1:
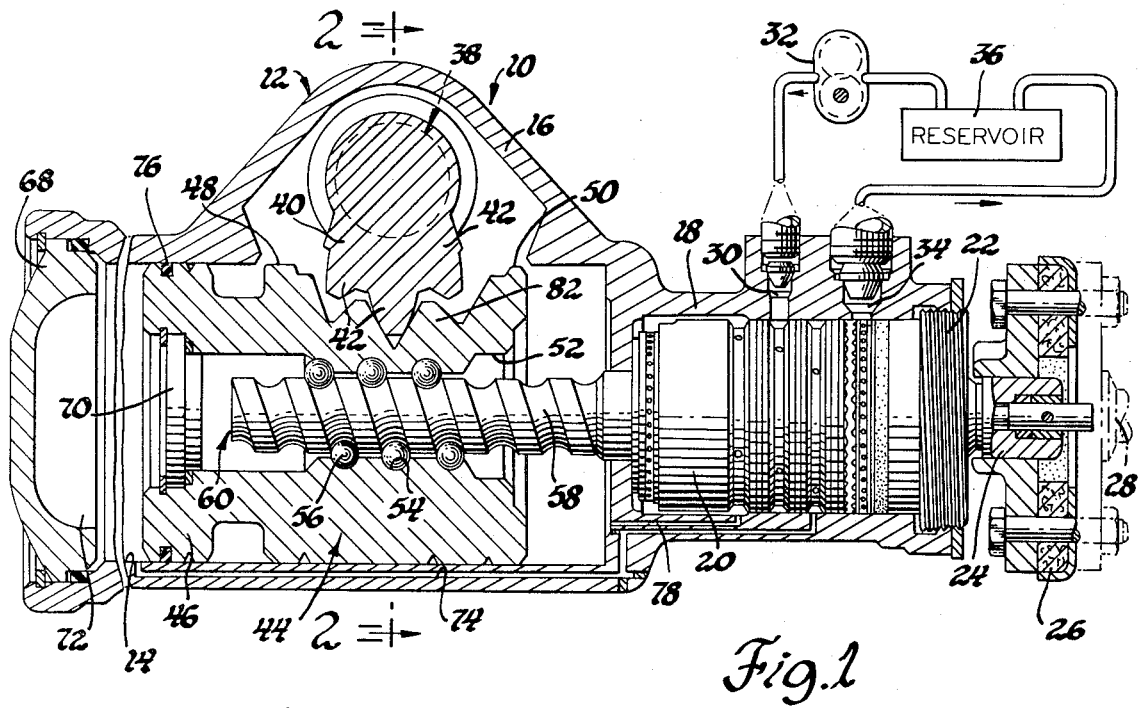
FIG. 1 is a horizontal sectional view of a steering gear assembly constructed according to this invention.

Referring now to the drawings, FIG. 1 depicts a steering gear assembly particularly adapted for automotive applications and designated generally 10. The steering gear assembly includes a housing 12 defining a cylinder portion 14, a pitman shaft support portion 16, and a valve support portion 18. The valve support portion 18 houses a fluid directing valve assembly 20, the valve assembly being retained within the valve support portion by a first cap 22 threadedly received on the housing. For a full and complete description of the structure and operation of the valve assembly 20 reference may be made to U.S. Pat. No. 3,022,772, issued in the name of P. B. Zeigler et al, on Feb. 27, 1962, and assigned to the assignee of this invention.

Generally, the valve assembly rotates within the support portion 18 in response to rotation of a shaft 24 which is connected through a flexible coupling 26 to a steering shaft 28, the steering shaft being rotated by the operator of the vehicle through a conventional steering hand wheel, not shown, disposed on the distal end of the steering shaft. Hydraulic fluid is supplied to the valve assembly 20 through an inlet port 30 from a pump 32 and exhausted through an exhaust port 34 to a reservoir 36 for the pump 32.

The steering gear assembly 10 further includes a pitman shaft 38 rotatably disposed on the support portion 16 of the housing 12. As is conventional, the pitman shaft extends beyond the lower extremity of the support portion 16 and is adapted for connection through conventional linkage, not shown, to the steerable wheels of the vehicle so that rotation of the pitman shaft about its axis effects steering rotation of the wheels.

Figure 2:
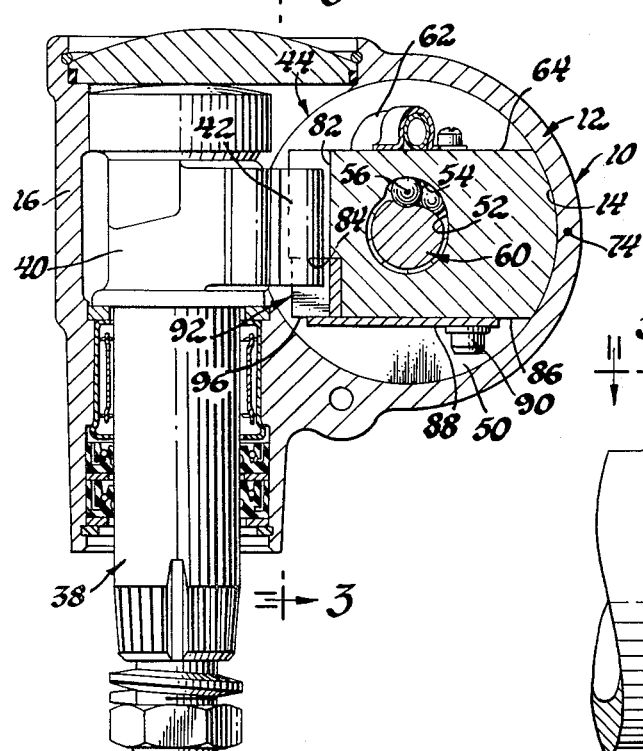
FIG. 2 is an enlarged, fragmentary, sectional view of the invention taken generally along the plane indicated by lines 2—2 of FIG. 1.
Figure 3:
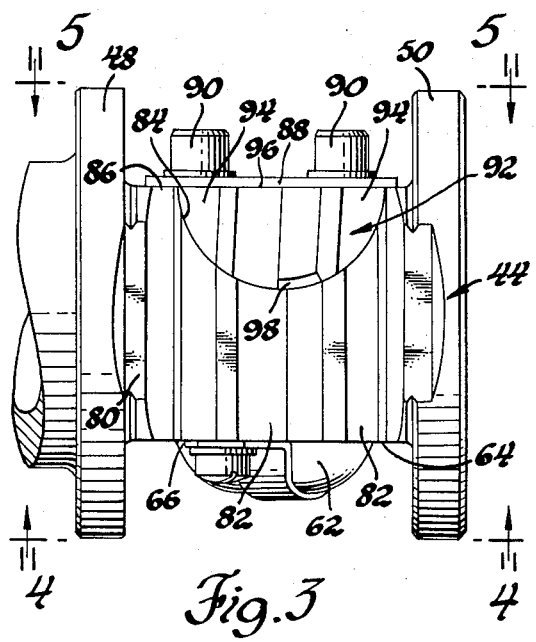
FIG. 3 is a view taken generally along the plane indicated by lines 3—3 in FIG. 2.
Figure 4:
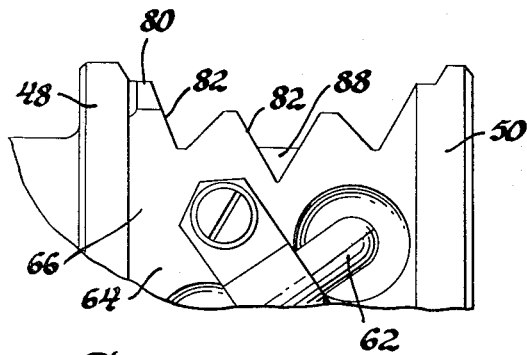
FIG. 4 is a view taken generally along the plane indicated by lines 4—4 in FIG. 3.
Figure 5:
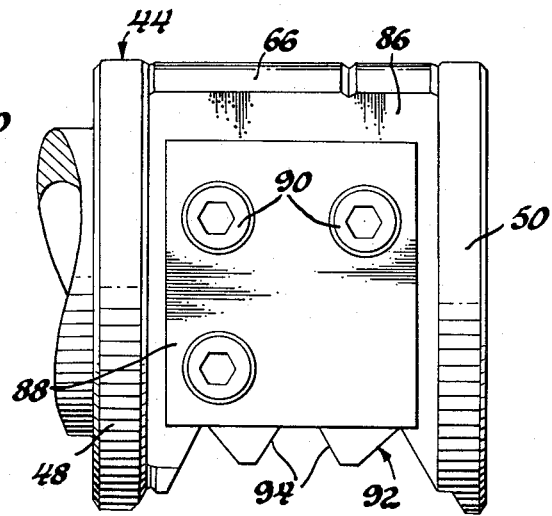
FIG. 5 is a view taken generally along the plane indicated by lines 5—5 in FIG. 3.

As seen best in FIGS. 1 and 2, the pitman shaft 38 has integrally formed therewith a sector 40 on which are machined a plurality of straight gear teeth 42. The gear teeth 42 differ from conventional pitman shaft sector gear teeth, which embody a tapered configuration for permitting lash adjustment through longitudinal movement of the pitman shaft, in that the root of each tooth 42 is parallel to the longitudinal axis of the pitman shaft. The pitman shaft 38, while being rotatably supported on the housing 12, is positively restrained against bodily shiftable movement in the direction of its longitudinal axis by conventional bearing means within the assembly.

Figure 8:
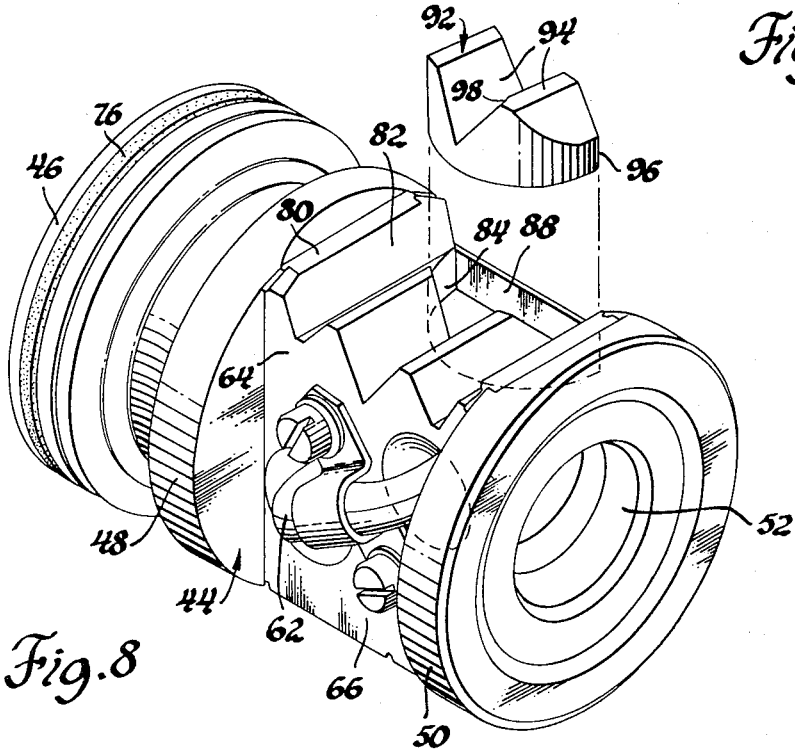
FIG. 8 is a perspective view of a portion of the steering gear assembly constructed according to this invention.

Referring now to FIGS. 1, 2 and 8, a rack nut member in the form of a rack piston 44 is slidably disposed in the cylinder portion 14 of the housing and includes a sealing land 46 and a pair of longitudinally spaced bearing lands 48 and 50. The rack piston 44 further includes a longitudinal bore 52 which has formed on a portion thereof an internal helical thread 54. The thread 54 receives a plurality of anti-friction balls 56 which, in addition to rolling in the thread 54, also roll in an external thread 58 on a worm shaft 60, the worm shaft being journaled on the housing 12 and rotatable by the shaft 24 in response to rotation of the steering shaft 28. Accordingly, as the worm shaft rotates, the rack piston 44 is caused to translate within the housing along the longitudinal axis of the worm shaft, the anti-friction balls simultaneously recirculating from one end of the thread 54 to the other through a ball guide 62 rigidly attached to a milled surface 64 of a center section 66 of the rack piston between the bearing lands 48 and 50.

The cylinder portion 14 is closed and sealed at the leftward end of the housing 12, FIG. 1, by a second cap 68 and the leftward end of the bore 52 in the rack piston is closed by a plug 70, the second cap and the plug cooperating with the housing and the rack piston in defining a first pressure chamber 72 connected to the valve assembly 20 through a passage 74 in the housing. A seal 76 on the rack piston separates the first pressure chamber 72 from the remainder of the interior of the housing 12 which remainder defines a second pressure chamber connected to the valve assembly through passage 78.

As is well known in the art, the pump 32 supplies hydraulic fluid under pressure to the valve assembly 20 which in turn directs the pressurized fluid to either of the first and second pressure chambers in response to rotation of the steering shaft 28. Thus, when the worm shaft is rotated by the steering shaft 28 in a direction corresponding to rightward movement of the rack piston 44, FIG. 1, fluid is supplied under pressure through the passage 74 to the first pressure chamber 72 wherein it reacts against the left end face of the rack piston thereby to assist rightward movement of the latter, the second pressure chamber being vented to the reservoir 36 through the exhaust port 34. Conversely, when the worm shaft is rotated in the opposite direction, the second pressure chamber is pressurized by the valve assembly through the passage 78 thereby to aid leftward movement of the rack piston, the first pressure chamber being vented to the reservoir through exhaust port 34.

As seen best in FIGS. 1, 2, 3 and 8, the center section 66 of the rack piston 44 includes a vertical wall portion 80 in which are machined a plurality of straight rack teeth 82 adapted for meshing engagement with the straight gear teeth 42 on the sector 40. Accordingly, as the rack piston 44 translates within the cylinder portion 14 under the influence of both the pressurized hydraulic fluid and the worm shaft, the sector gear and pitman shaft are caused to pivot or rotate about the longitudinal axis of the pitman shaft. The center section 66 of the rack piston further includes a semicircular cavity 84 machined into the rack teeth 82 in a direction perpendicular to the plane of the latter, the cavity opening upwardly and intersecting the plane defined by a mounting surface 86, FIG. 3, parallel to the surface 64 and spaced vertically therefrom.

As seen best in FIGS. 2, 3, 5 and 8, a square spring plate 88 is fastened to the mounting surface 86 by three screws 90 with a portion of the spring plate projecting beyond the edge of the cavity 84. The screws 90 attach three corners of the plate 88 to the rack piston, FIG. 5, so that the fourth or unrestrained corner is free to deflect away from the plane of the mounting surface 86, the unrestrained corner of the plate functioning as a cantilever type spring during such deflection. An antilash insert 92 is adapted for disposition in the cavity 84 below the spring plate 88, the insert 92 being generally semi-circular in configuration and including a plurality of tooth segments 94 and a flat, bearing surface 96. The teeth 94 are machined in the insert 92 at an angle $\theta$, FIG. 6, with respect to a line perpendicular to the plane of the bearing surface 96. Accordingly, when the insert is disposed in the cavity 84, FIG. 3, the spring plate 88 and the bearing surface 96 are disposed in the plane of the mounting surface 86 thus defining an offset position of the insert 92 wherein the tooth segments 94 are disposed at the angle $\theta$ with respect to the rack teeth 82.

Figure 6:
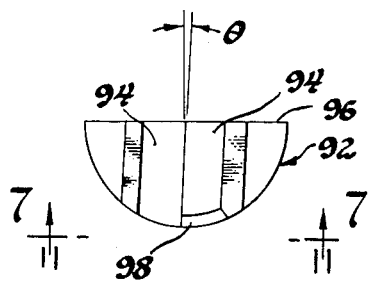
FIG. 6 is an elevational view of the anti-lash insert portion of the steering gear assembly.
Figure 7:
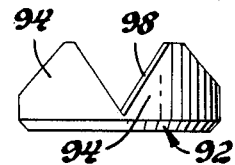
FIG. 7 is a view taken generally along the plane indicated by lines 7—7 in FIG. 6.

Describing now the operation of the anti-lash insert 92 and referring particularly to FIGS. 1, 2, 3 and 7, the right tooth segment 94, FIG. 6, has a chamfer 98 thereon which projects beyond the corresponding rack tooth 82 in the offset position of the insert 92 when the rack teeth are not in engagement with the gear teeth 42 on the sector 40. When the pitman shaft 38 is installed on the housing 12 subsequent to installation on the latter of the rack piston, the shaft and the gear teeth are shifted downwardly, FIG. 2, past the surface 64 toward the spring plate 88 to achieve meshing engagement between the gear teeth 42 and 82. As the lower edges of the gear teeth approach the insert 92, the lower edge of the center 42 tooth 41 engages the chamfer 98 and, upon continued downward movement of the pitman shaft, cams or pivots the insert 92 out of the offset position toward an aligned position, not shown, wherein the profile of the tooth segments 94 coincides with the profile of the rack teeth 82. As the insert 92 is thus pivoted, the unrestrained corner of the spring plate 88 is deflected away from the surface 86 thereby biasing the insert 92 back toward the offset position. Accordingly, when the gear teeth 42 achieve full engagement with respect to the rack teeth and the tooth segments, FIG. 2, the bias of the spring plate 88 causes the tooth segments to resiliently urge the gear teeth into engagement on the opposite side of the corresponding ones of the rack teeth. Thus, the gear teeth are tightly captured between corresponding ones of the rack teeth and tooth segments on the insert 92 so that lash between the rack teeth and gear teeth is totally eliminated. The continuous spring bias of the plate 88, of course, provides automatic adjustment for any wear occurring between the gear teeth and the rack teeth.

The force generated by the spring plate and transferred to the gear teeth through the segment 94 is substantial enough to accommodate the typical forces transferred between the gear teeth 42 and rack teeth 82 during ordinary steering operations so that the spring plate does not deflect to permit back-lash when the direction of steering shaft rotation is reversed. If, however, unusually large forces are caused to be transferred, the spring plate will deflect to prevent jamming of the teeth.

With particular reference to FIG. 1, it will be apparent to those skilled in the art that the rack nut member as defined by the rack piston 44 is the equivalent of an ordinary rack nut in a conventional manual steering gear assembly. In the conventional manual steering gear assembly, the rack nut includes an internal thread for receiving the balls 56 and a plurality of rack teeth for engagement in the sector gear teeth 42 but lacks the hydraulic fluid reaction surfaces associated with power assisted steering gear assemblies such as that described hereinbefore and depicted in the drawings. Accordingly, the anti-lash features according to this invention are equally applicable to both manual and power assisted type steering gear assemblies.

Having thus described the invention, what is claimed is:

1. In a steering gear assembly of the type including a housing, a worm shaft disposed on said housing for rotation about a first axis of the latter, a rack nut member disposed on said worm shaft for bodily shiftable movement along said first axis in response to rotation of said worm shaft and defining a plurality of straight rack teeth, and a sector member disposed on said housing for pivotal movement about a second axis of the latter, having a plurality of straight gear teeth the roots of which extend parallel to said second axis, said gear teeth being adapted for meshing engagement on said rack teeth so that bodily shiftable movement of said rack nut member effects concurrent pivotal movement of said sector member, the improvement comprising, means on said rack nut member defining a cavity in said rack teeth, an anti-lash insert adapted for disposition in said cavity and including a plurality of tooth segments defining a profile corresponding to the profile of said rack teeth, means supporting said insert on said nut member within said cavity for movement between an aligned position wherein each of said tooth segments registers with a corresponding one of said rack teeth and an offset position wherein each of said tooth segments is offset with respect to the corresponding one of said rack teeth, and spring means disposed between said insert and said rack nut member for biasing said insert toward the offset position thereof, said gear teeth upon meshing engagement with said rack teeth being engageable on said tooth segments and operative to move said insert toward the aligned position so that the ones of said gear teeth in meshing engagement with said rack teeth are resiliently captured in a no-lash condition between said rack teeth and said tooth segments.

2. The improvement recited in claim 1 wherein said insert is disposed on said rack nut member for pivotal movement between the offset position and the aligned position, each of said tooth segments in the offset position of said insert being disposed at an angle with respect to the corresponding one of said rack teeth.

3. In a steering gear assembly of the type including a housing, a worm shaft disposed on said housing for rotation about a first axis of the latter, a rack nut member disposed on said worm shaft for bodily shiftable movement along said first axis in response to rotation of said worm shaft, and a sector member disposed on said housing for pivotal movement about a second axis of the latter, said sector member having a plurality of straight gear teeth the roots of which extend parallel to said second axis, the combination comprising, means on said rack nut member defining a plurality of straight rack teeth bounded on one end by a flat mounting surface of said nut member, said mounting surface being disposed in a plane perpendicular to the plane of said rack teeth, means on said rack nut member defining a semi-circular cavity in said rack teeth intersecting the plane of said mounting surface, a semi-circular anti-lash insert adapted for disposition in said cavity and including a plurality of tooth segments having a profile corresponding to the profile of said rack teeth and a flat bearing surface disposed in a plane perpendicular to the plane of said tooth segments, said cavity supporting said insert on said rack nut member for pivotal movement about an axis perpendicular to the plane of said rack teeth between an aligned position wherein each of said tooth segments registers with a corresponding one of said rack teeth and said bearing surface is disposed at an angle with respect to said mounting surface with a portion of the former projecting above the plane of the latter and an offset position wherein each of said tooth segments is disposed at an angle with respect to the corresponding one of said rack teeth and said bearing surface is coplanar with said mounting surface, a flat spring plate, and means mounting said spring plate on said mounting surface for engagement on said insert bearing surface thereby to continuously urge said insert toward the offset position thereof, said sector member gear teeth being meshingly engageable on said rack teeth and on said tooth segments and operative to pivot said insert toward the aligned position so that the ones of said gear teeth in meshing engagement with said rack teeth are captured in a no-lash condition between each of said tooth segments and corresponding ones of said rack teeth.

* * * * *